United States Patent [19]
Cich et al.

[11] 4,205,149
[45] May 27, 1980

[54] METHOD OF REMOVING VINYL CHLORIDE MONOMER FROM POLYVINYL CHLORIDE RESINS

[75] Inventors: Frank A. Cich, Norton; Emmett J. Glazer, Stow; Edwin S. Smith, Cuyahoga Falls, all of Ohio

[73] Assignee: The Goodyear Tire & Rubber Company, Akron, Ohio

[21] Appl. No.: 535,775

[22] Filed: Dec. 23, 1974

[51] Int. Cl.² ............... C08F 2/60; C08F 2/16; C08F 6/10; C08F 16/6
[52] U.S. Cl. .................. 526/89; 526/344.1; 526/344.2; 528/498; 528/501
[58] Field of Search ............ 260/92.8 R, 92.8 W, 260/92.8 A; 526/89, 344.1, 344.2; 528/498, 501

[56] References Cited

U.S. PATENT DOCUMENTS

| 2,715,117 | 8/1955 | Baeyaert | 260/92.8 |
|---|---|---|---|
| 2,719,143 | 9/1955 | Van Dijk et al. | 260/92.8 W |
| 3,052,663 | 9/1962 | Bodlaender et al. | 260/92.8 A |
| 3,111,506 | 11/1963 | Roussillon et al. | 260/92.8 A |
| 3,324,097 | 6/1967 | Pears | 260/92.8 W |
| 3,485,775 | 12/1969 | Cenci et al. | 260/86.1 X |
| 3,488,328 | 1/1970 | Koyanasi et al. | 260/92.8 W |
| 3,509,109 | 4/1970 | Buning et al. | 260/92.8 R |
| 3,557,244 | 1/1977 | Schrage | 260/92.8 R |
| 3,635,928 | 1/1972 | Thomas | 528/501 |
| 3,696,083 | 10/1972 | Hwa | 260/92.8 W |
| 3,784,532 | 1/1974 | Fellmann | 260/86.1 E |

FOREIGN PATENT DOCUMENTS

| 1098714 | 2/1961 | Fed. Rep. of Germany | 450/698.5 |
|---|---|---|---|
| 0723991 | 2/1955 | United Kingdom . | |
| 1129012 | 4/1967 | United Kingdom | 450/698.5 |

Primary Examiner—Joseph L. Schofer
Assistant Examiner—Herbert J. Lilling
Attorney, Agent, or Firm—J. P. Ward

[57] ABSTRACT

This invention relates to a method for the removal of vinyl chloride monomer from polyvinyl chloride resins by lowering the Tg (glass transition temperature) of the polyvinyl chloride resins at an elevated temperature while in the presence of reduced pressure thus allowing the vinyl chloride monomer to escape from the polyvinyl chloride resins.

4 Claims, No Drawings

METHOD OF REMOVING VINYL CHLORIDE MONOMER FROM POLYVINYL CHLORIDE RESINS

This invention relates to a method for reducing residual vinyl chloride monomer in polyvinyl chloride resins during manufacturing operations. More specifically this invention relates to a method of increasing the rate of vinyl chloride removal from polyvinyl chloride resins by adding a small amount of a Tg depressant.

A great many useful articles have been manufactured from polyvinyl chloride (PVC) resins which are made by the polymerization of vinyl chloride monomer (VCM). Recent experiments have shown that angiosarcoma develops in animals exposed to VCM. Action should be taken to reduce human exposure to VCM during the manufacture and processing of PVC resins. PVC resins are generally manufactured by polymerizing vinyl chloride monomer in bulk, suspension or emulsion systems using VCM and polymerization catalysts to form the PVC resins. Other monomers can be used with vinyl chloride in polymerization processes. The product of the polymerization is a PVC resin containing minor amounts, e.g., 100 to 500 parts per million (ppm) of VCM in a residual free form. The PVC is obtained as a finely divided resin and the residual VCM will slowly diffuse from the resin as a gas. Such natural diffusion, however, normally requires many days for the VCM content of the PVC resin to reach levels below 10 ppm. During this time, while the newly made resin is undergoing any subsequent manufacturing operations, humans are exposed to the residual, unreacted VCM contained therein which escapes to the breathable atmosphere. It is desirable that less than one part per million of VCM be present in the PVC resin. It is also desirable that VCM not be lost to atmosphere which is consumed by humans. Unreacted VCM should be removed from breathable atmosphere and preferably recycled.

Attempts to accelerate the diffusion of VCM from PVC resins have included heating the PVC resins to drive off the residual monomer or placing the resin in a reduced pressure environment and allowing the vapor pressure of the VCM to remove the monomer. High temperatures (above 90° C.) have been used to drive off unreacted VCM, but such methods significantly degrade the resin because of the time necessary to remove VCM even at these elevated temperatures. These methods thus have the disadvantage of being relatively slow and of degrading the resins. In addition, the VCM is lost to the atmosphere and is not recovered. Both health considerations and economic costs dictate that the VCM not be lost to the atmosphere.

It is therefore an object of the present invention to provide a process whereby VCM can be economically removed from the polymerization mixture before exposure of the PVC resin to the atmosphere and while the PVC resin is still contained in a polymerization system. The advantages of such a process are substantially complete recovery of the VCM, no atmospheric pollution and removal of the need for health regulations and precautions in finishing operations of PVC resins.

It has now been discovered in accordance with the present invention that VCM can be more rapidly removed from PVC by adding a Tg depressant either to the polymerization system initially or directly after the reaction or by adding the depressant to the polymerization system during the normal degassing currently practiced in the art, while heating the resin above its depressed glass transition temperature while under reduced pressure. The term "Tg" refers to the second order transition temperature (sometimes called glass transition temperature) which is more fully explained in F. Bueche's *Physical Properties of Polymers*, Interscience Publishers, 1962, page 108. Such a procedure subjects only a relatively small portion of the manufacturing facility to stringent government regulations concerning VCM levels such as the Occupational Safety and Health Act (OSHA), and enables existing facilities to meet these stringent requirements. Exposure of humans is thus kept to a minimum in terms of both time and level of VCM. The polyvinyl chloride resins of the present invention are resins containing at least 75 percent bound vinyl chloride. Combinations of other monomers can be used. The invention is effective when the bound vinyl chloride content of the resins formed is at least 75 percent, even when a multiplicity of other monomers are present in a total weight percentage of 25 percent or less based on the weight of the resin. Substantially free of monomeric vinyl chloride refers to the level of vinyl chloride monomer in the PVC resin at the time exposed to the outside atmosphere. Substantially free levels are from about 50 ppm to about 1 ppm, but from about 20 ppm to about 1 ppm can be obtained. From about 10 ppm to about 1 ppm can be obtained with some depressants.

It is known in the art that the diffusion rate of materials through a resin is enhanced at temperatures above the Tg of that resin. While the mechanism of the present invention is not definitely known, it is believed that the increased rate of diffusion of the unwanted VCM from the PVC resin is due to the lowering of the PVC Tg by the material added. It is believed that any material which lowers the Tg of the PVC resin without degrading the resin in combination with high temperatures and reduced pressures can be used. Some materials which depress the Tg wil remain in the resin after the VCM has been removed. An example is dioctyl phthalate, known for its beneficial effects as a plasticizing agent. Dioctyl phthalate will rapidly remove VCM under conditions of high temperature and a vacuum, yet will remain in the resin and provide beneficial plasticizing properties well known to those skilled in this art. Other Tg depressants such as propane will be substantially removed with the VCM and will not remain in the resin. The VCM removed, whether alone or in combination with a volatile Tg depressant, can be recovered and reused without separation from the propane. Volatile Tg depressants are then recycled with the VCM in succeeding batches, providing an economical method of carrying out the present invention. Combinations of Tg depressants can be used.

Tg depressants such as tetrahydrofuran which are also solvents for PVC resins are effective in removing VCM during initial degassing, but tend to lose effectiveness later in the process. It is believed that this effect is caused by the solvating action of the depressant closing the pore openings in the PVC resins, thus sealing VCM in the resin.

"Polymerization system" in the context of the present invention refers to all materials charged to a reactor before, during, or after polymerization and resultant polyvinyl chloride resins so long as separated from the outside atmosphere. The PVC resin is considered to be in the polymerization system up to the time the resin is exposed to outside atmosphere. Outside atmosphere is defined as the atmosphere people breath. In the present invention the Tg depressant and vinyl chloride monomers can be recycled. Thus in the context of the present invention the PVC resin is made substantially free of VCM before exposure to breathable atmosphere, avoiding health problems previously described.

The efficiency of the VCM removal varies with the choice of Tg depressant, temperature and vacuum levels. Tg depressants are generally useful from about 0.001 to about 5 parts based on the weight of the resin, although more than 5 parts can be used. From 0.005 part to 2.5 parts are preferred. The level used will depend on the effectiveness of the material used in depressing the Tg of the PVC and on secondary effects, such as plasticizing properties, desired.

Generally the higher the temperature, the more efficient the VCM removal. The most preferred temperature is therefore as high as possible without degradation of the PVC, although cooler temperatures can be used. Generally from 50° C. to 85° C. is used but from 65° C. to 85° C. is preferred and 75° C. is most preferred.

The pressure used should be as low as possible for maximum efficiency, but the invention will function, though less efficiently, at pressures higher than the vapor pressure of VCM relative to the polymerization system's temperature. Generally in an aqueous system a reduced pressure of from about 450 millimeters of mercury down to a reduced pressure sufficient to cause reflux of the system at the temperature used is required. In a bulk polymerization system, a reduced pressure of about 300 millimeters of mercury is used but zero millimeters of mercury pressure would be preferred.

Tg depressants useful in the present invention are aromatic compounds substituted with alkyl radicals having from 1 to 10 carbon atoms and alkylene radicals having from 2 to 10 carbon atoms, alcohols having from 1 to 20 carbon atoms with from 1 to 7 carbon atoms preferred, alkanes having from 1 to 20 carbon atoms with from 1 to 7 carbon atoms preferred, alkenes having from 2 to 20 carbon atoms with from 2 to 7 carbon atoms preferred, alkyl thiol glycolates wherein the alkyl contains from 1 to 20 carbon atoms, ketones having from 3 to 6 carbon atoms, adipates containing 1 to 10 carbon atoms in the esterifying alcohol, azelates containing 1 to 10 carbon atoms in the alcohol portion, benzoic acid derivatives containing 1 to 10 carbon atoms in the alcohol portion, citric acid derivatives containing 1 to 10 carbon atoms in the alcohol portion, fumaric acid derivatives containing 1 to 10 carbon atoms in the alcohol portion, glycol derivatives containing 1 to 10 carbon atoms in the acid portion, isophthalic acid derivatives containing 1 to 10 carbon atoms in the alcohol portion, maleic acid derivatives containing from 1 to 10 carbon atoms in the alcohol portion, trimellitates containing from 1 to 10 carbon atoms in the alcohol portion, phosphoric acid derivatives containing 1 to 10 carbon atoms in the alcohol portion, phthalic acid derivatives containing 1 to 10 carbon atoms in the esterifying alcohol, succinic acid derivatives containing 1 to 10 carbon atoms and sebacic acid derivatives containing 1 to 10 carbon atoms in the esterifying alcohol.

Representative examples of Tg depressants useful in the present invention are toluene, methane, ethane, propane, propylene, ethylene, decyl benzene, styrene, 1-phenyl decene, hexane, eicosane, xylene, acetone, ethyl chloride, trichlorofluromethane, eicosylene-1, tetrahydrofuran, methyl ethyl ketone, butane, pentane, methanol, ethanol, isopropanol, propanol, 1-eicosanol, methylene chloride, dimethyl phthalate, dibutyl phthalate, dioctyl phthalate, dioctyl adipate, cyclohexanone, cyclohexane, carbon tetrachloride, didecane, chloroform, dimethyl thioglycolate, dioctyl thioglycolate, dieicosyl thioglycolate, dimethyl adipate, diisooctyl adipate, didecyl adipate, dimethyl azelate, diisooctylazelate, didecyl azelate, diethylene glycol dibenzoate, polyethylene glycol (up to 600 molecular weight) dibenzoate, trimethyl citrate, didecyl citrate, dimethyl fumarate, didecyl fumarate, ethylene glycol diacetate, glycerol tricaprylate, dimethyl isophthalate, didecyl isophthalate, dimethyl maleate, didecyl maleate, trimethyl trimellitate, triisodecyl trimellitate, trimethyl phosphate, triphenyl phosphate, tridecyl phosphate, dimethyl phthalate, diisooctyl phthalate, didecyl phthalate, isopentane, neopentane, 2-methyl pentane, 3-methyl pentane, 2,2-dimethyl butane, 2,3-dimethyl butane, dimethyl sebacate, didecyl sebacate, dimethyl succinate and didecyl succinate. Most preferred are heptane, propane, butane, ethane, pentane, hexane, toluene, ethyl chloride, methanol, ethanol, propanol, isopropanol, acetone, isopentane, neopentane, 2-methyl pentane, 3-methyl pentane, 2,2-dimethyl butane and 2,3-dimethyl butane.

The invention is more concretely described with reference to the examples below wherein all parts and percentages are by weight unless otherwise specified. In the following examples all bulk, suspension and emulsion polymerization systems are carried out using standard techniques and recipes well known to those skilled in the art.

EXAMPLE 1

A bulk polymerization system was charged with 100 parts of VCM, a catalyst and various polymerization aids. A normal polymerization recipe plus 5 parts of propane were charged to the reactor and the polymerization carried out as usual. At the end of the polymerization cycle, the reactor was vented to a storage tank of VCM and reduced in pressure to atmospheric pressure. The resin contained 3 percent VCM at this point in the polymerization. The reactor temperature was adjusted to 75° C. and the pressure in the reactor reduced to remove the propane and VCM (approximately 25 millimeters of mercury pressure). The VCM and propane were exhausted through a compressor. No separation of the monomer and the propane was carried out. The VCM and propane could be exhausted to monomer storage unit where the amount of propane charged to subsequent reactor batches could be adjusted according to the concentration of propane in the monomer storage unit. After one-half hour under these conditions the VCM content of the PVC resin was less than one part per million compared with 30 ppm found in a subsequent polymerization in the absence of propane.

EXAMPLE 2

Suspension and emulsion polymerizations were carried out using standard polymerization procedures. A polymerization recipe and 2.5 parts of propane were charged to the reactor and the polymerization carried out as normal. At the end of the polymerization cycle the temperature of the reactor was adjusted to 75° C. and pressure in the reactor reduced sufficiently to cause the contents of the aqueous system to reflux. The VCM and propane were treated exactly as described in Example 1. After one hour of reflux under these conditions the VCM content of the aqueous system was 5 ppm based on the dry resin. After two hours less than one part ppm was found. During a subsequent polymerization carried out in the absence of propane the VCM concentration of the PVC resin was 65 ppm after two hours, and required five hours to reach less than 1 ppm.

EXAMPLE 3

A reaction was carried out in the same manner as described for Example 2 except that dibutyl phthalate was used in the place of propane and added after polymerization rather than with the initial VCM charge. After one hour evacuation at 75° C. and at reduced pressure sufficient to cause the system to reflux, the VCM level in the PVC resin was one-third of that of a control polymerization carried out without dibutyl phthalate. At the end of the polymerization the dibutyl phthalate remained in the resin after the VCM elimination. The dibutyl phthalate would contribute to the properties of an article subsequently prepared from the resin.

EXAMPLE 4

A suspension polymerization was carried out as described in Example 2 in the absence of propane. After the reaction was complete, 3⅓ parts of propylene was added to the reaction mixture and the mixture was stirred for 10 minutes. After one-half hour at 88° C. and a reduced pressure sufficient to cause reflux of the system the VCM content of the PVC resin was less than 10 ppm.

The following Table I is of comparative examples of emulsion polymerizations carried out with and without Tg depressants. The Tg depressant was added to Example 2 of Table I after polymerization was complete. All other examples were added with the VCM charge. It can be easily seen from the results that the addition of a Tg depressant in combination with high level of temperature and reduced pressure greatly accelerates the removal of the VCM from the PVC resin.

Table I

| | Emulsion Systems | | | |
|---|---|---|---|---|
| Tg Depressant | Tg | Conditions (Temp. & Pressure) | Time Min. | ppm VCM |
| (1) None | 81° C. | cold | 0 | 22,000 |
| None | 81° C. | 99° C. | 75 | 16 |
| (2) 3 parts toluene | 65° C. | cold | 0 | 24,800 |
| 3 parts toluene | 65° C. | 99° C. | 60 | <1 |
| (3) 3 parts ethyl chloride | | cold | 0 | 8,800 |
| 3 parts ethyl chloride | | 290 mm at 75° C. | 90 | <1 |
| (4) 3 parts propane | | cold | 0 | 44,000 |
| 3 parts propane | | 290 mm at 75° C. | 60 | <1 |
| (5) 1 part n-butane | | cold | 0 | 14,400 |
| 1 part n-butane | | 290 mm at 75° C. | 60 | <1 |

Table II shows comparative examples of bulk polymerizations using various Tg depressants at 5.0 parts based on the weight of resin. The Tg depressants in Examples 13 and 14 were added with the VCM charge at the 5.0 part level based on the weight of monomer to the polymerization medium. In all other examples Tg depressants were added after the polymerization.

Table II

| | Bulk Systems | | | |
|---|---|---|---|---|
| Ex. | Tg Depressant | Tg | Conditions (Temp. & Pressure) | Time Min. | ppm VCM |
| 1 | None | 81° C. | | 0 | 600 |
| 2 | None | 81° C. | 20 mm at 75° C. | 30 | 56 |
| 3 | Cyclohexane | | 20 mm at 75° C. | 30 | 24 |
| 4 | Methylene chloride | | 20 mm at 75° C. | 30 | 12 |
| 5 | Methanol | | 20 mm at 75° C. | 30 | 3 |
| 6 | Cyclohexanone | | 20 mm at 75° C. | 30 | 2 |
| 7 | Toluene | 53° C. | 20 mm at 75° C. | 30 | <1 |
| 8 | Ethanol | | 20 mm at 75° C. | 30 | <1 |
| 9 | Isopropanol | 74° C. | 20 mm at 75° C. | 30 | <1 |
| 10 | Acetone | | 20 mm at 75° C. | 30 | <1 |
| 11 | Toluene/Methanol 20/80 | | 20 mm at 75° C. | 30 | <1 |
| 12 | None | 81° C. | 20 mm at 75° C. | 15 | 160 |
| 13 | Butane 3.3 parts | | 20 mm at 75° C. | 15 | 31 |
| 14 | Propane 6.7 parts | | 20 mm at 75° C. | 15 | 16 |

Table III shows the results of placing a PVC resin under reduced pressure and elevated temperatures while in the presence of 5.0 parts of a Tg depressant. The resin was produced in a five gallon laboratory reactor using suspension polymerization techniques. Tg depressants were added and the experiments were carried out in a 2000 milliliter, 3-neck glass flask immediately after the polymerization was complete. The flask contents were heated to 75° C. while at 290 millimeters of mercury pressure. Table III shows data resulting from adding 5 parts Tg depressant while Table IV data resulted from addition 2.5 parts Tg depressant.

Table III

| | Suspension System | | | | |
|---|---|---|---|---|---|
| Amount of VCM on dry resin basis | Control (no depressant) | Toluene | Xylene | Tetrahydrofuran | Dibutyl Phthalate |
| Untreated slurry | 45,450 ppm | 41,800 ppm | 43,600 ppm | 47,300 ppm | 50,900 ppm |
| Beginning of reflux | 3,640 ppm | 640 ppm | 710 ppm | 1,600 ppm | 1,130 ppm |
| After 1 hour of reflux | 145 ppm | 9 ppm | 22 ppm | 218 ppm | 35 ppm |
| Tg | 81° C. | 53° C. | — | — | — |

The data in Table IV was obtained using the same procedure as in Table III except that the Tg depressant at a 2.5 part level was added to the five gallon reactor in the initial monomer charge.

Table IV

| | Suspension | | | |
|---|---|---|---|---|
| Amount of VCM on dry resin basis | Control (no depressant) | Propane | (1 part) Propane | Butane |
| Untreated slurry | 21,800 ppm | — | 40,000 ppm | 29,100 ppm |
| After 1 hour of reflux | 218 ppm | 5 ppm | 20 ppm | 49 ppm |

While certain representative embodiments and details have been shown for the purpose of illustrating the invention, it will be apparent to those skilled in this art that various changes and modifications may be made therein without departing from the spirit or scope of the invention.

We claim:

1. The method which comprises polymerizing monomeric vinyl chloride in an emulsion or suspension polymerization system to form vinyl chloride polymer in the presence of propane and reducing the pressure in the system to remove substantially all of the unreacted vinyl chloride and propane from the system.

2. The method which comprises polymerizing monomeric vinyl chloride in an emulsion or suspension polymerization system to form polymeric vinyl chloride, adding propane to the system and then reducing the pressure in the system to remove substantially all of the unreacted vinyl chloride and propane from the system.

3. The method which comprises polymerizing monomeric vinyl chloride in a bulk polymerization system to form polymeric vinyl chloride in the presence of butane and reducing the pressure in the system to remove substantially all of the unreacted vinyl chloride monomer and butane from the system and recovering the polymeric vinyl chloride formed substantially free of monomeric vinyl chloride.

4. The method which comprises polymerizing vinyl chloride in a bulk polymerization system to form polymeric vinyl chloride, adding butane to the system and then reducing the pressure in the system to remove substantially all of the unreacted vinyl chloride monomer and butane from the system and recovering the polymeric vinyl chloride formed substantially free of monomeric vinyl chloride.

* * * * *